REMOTE SUPERVISORY FREQUENCY-SHIFT TRANSMISSION SYSTEM

Filed May 27, 1965 3 Sheets-Sheet 1

INVENTOR:
THOMAS I. MARX

BY,

Dike, Thompson, Bronstein & Mrose
ATTORNEYS

INVENTOR:
THOMAS I. MARX
BY,
Dike, Thompson, Bronstein & Mrose
ATTORNEYS

REMOTE SUPERVISORY FREQUENCY-SHIFT TRANSMISSION SYSTEM

Filed May 27, 1965

INVENTOR:
THOMAS I. MARX

BY,

Dike, Thompson, Bronstein & Mrose

ATTORNEYS

United States Patent Office 3,482,212
Patented Dec. 2, 1969

3,482,212

REMOTE SUPERVISORY FREQUENCY-SHIFT TRANSMISSION SYSTEM

Thomas I. Marx, Hingham, Mass., assignor to Sigma Instruments, Inc., South Braintree, Mass., a corporation of Massachusetts Filed May 27, 1965, Ser. No. 459,150
Int. Cl. H04q *11/02*
U.S. Cl. 340—171 17 Claims

ABSTRACT OF THE DISCLOSURE

Electrical signalling via a transmission link is achieved by alternately transmitting two different high-frequency signals at distinctive audio-frequency alternation rates for sustained periods; demodulation of the signals yields correspondingly sustained audio-frequency outputs which reliably characterize the transmitted intelligence.

The present invention relates to improvements in communication of intelligence by way of uniquely-encoded fixed-frequency signals, and, in one particular aspect, to novel and improved frequency-shift electrical transmission systems wherein intelligence is characterized by different sustained rates at which shifting is achieved and is simply, economically and reliably translated into output signals which are especially useful for such purposes as remote switching, control, and telemetering.

Frequency-shift keying (FSK) has long been well known in the art of communication, and holds the principal attraction that a pair of fixed-frequency sources (such as crystal oscillators) may advantageously be used to characterize the transmitted information. Techniques of this type have been proposed for telegraphy and carrier-current telemetering, and, even more intricately, for purposes of simulating clipped speech signals, for example. In such systems, switching between the different frequencies involved has developed a simple binary "on-off" coding synchronously slaved to the corresponding "on-off" states of the telegraph keying, clipped speech pulses, or the like. According to the present teachings, however, the switching of fixed-frequency carrier signals is brought about selectively at different rates, with the switching or shifting at each selected rate being sustained for a sufficient period to insure that a distinctive and readily-distinguishable continuous rate signal, or tone, will be realized as a demodulation product. Desirably high isolations from interference may be achieved in efficiently-operated equipment of relatively inexpensive construction which may usefully include conventional components, and the improved system lends itself particularly well to highly-reliable carrier-current type control of adjustable apparatus associated with electrical power distribution networks.

It is one of the objects of the present invention, therefore, to provide novel and improved frequency-shift apparatus wherein unique coding serves to promote reliable transmissions of intelligence.

Another object is to improve communications via frequency-shifting by characterizing information in terms of sustained predetermined rates of switching between fixed carrier frequencies.

A further object is to provide unique carrier-current control systems for power-distribution networks, in which shifting between predetermined carrier frequencies is produced at different sustained audio-frequency rates to convey command information to remote sites.

Still further, it is an object to provide new and advantageous frequency-shift apparatus of relatively low-cost construction which operates efficiently and positively to translate and telemeter data in terms of continuous electrical bursts involving different carrier frequencies alternately switched at distinctive rates.

By way of a summary account of practice of this invention in one of its aspects, switching signals occurring at distinctively different audio frequency rates are produced and selectively applied to control the sustained alternate applications of outputs from two different-frequency crystal-controlled oscillators to a transmission link at a transmitting station. These outputs appear at one or more receiving stations associated with the link, and and are there demodulated to develop sustained signals having audio frequencies corresponding to the switching rates produced simultaneously at the transmitting station to characterize certain intelligence. In those instances when the tuning of a reed or other appropriate frequency-selective device at the receiving station is at a frequency the same as that of the demodulated sustained signal which has been received, a distinctive output signal is produced for such purposes as capacitor switching.

Although the aspects and features of this invention which are believed to be novel are expressed in the appended claims, additional details as to preferred practices and embodiments, and as to the further advantages, objects and features thereof, may be most readily comprehended through reference to the following description taken in connection with the accompanying drawings, wherein:

Figure 1:
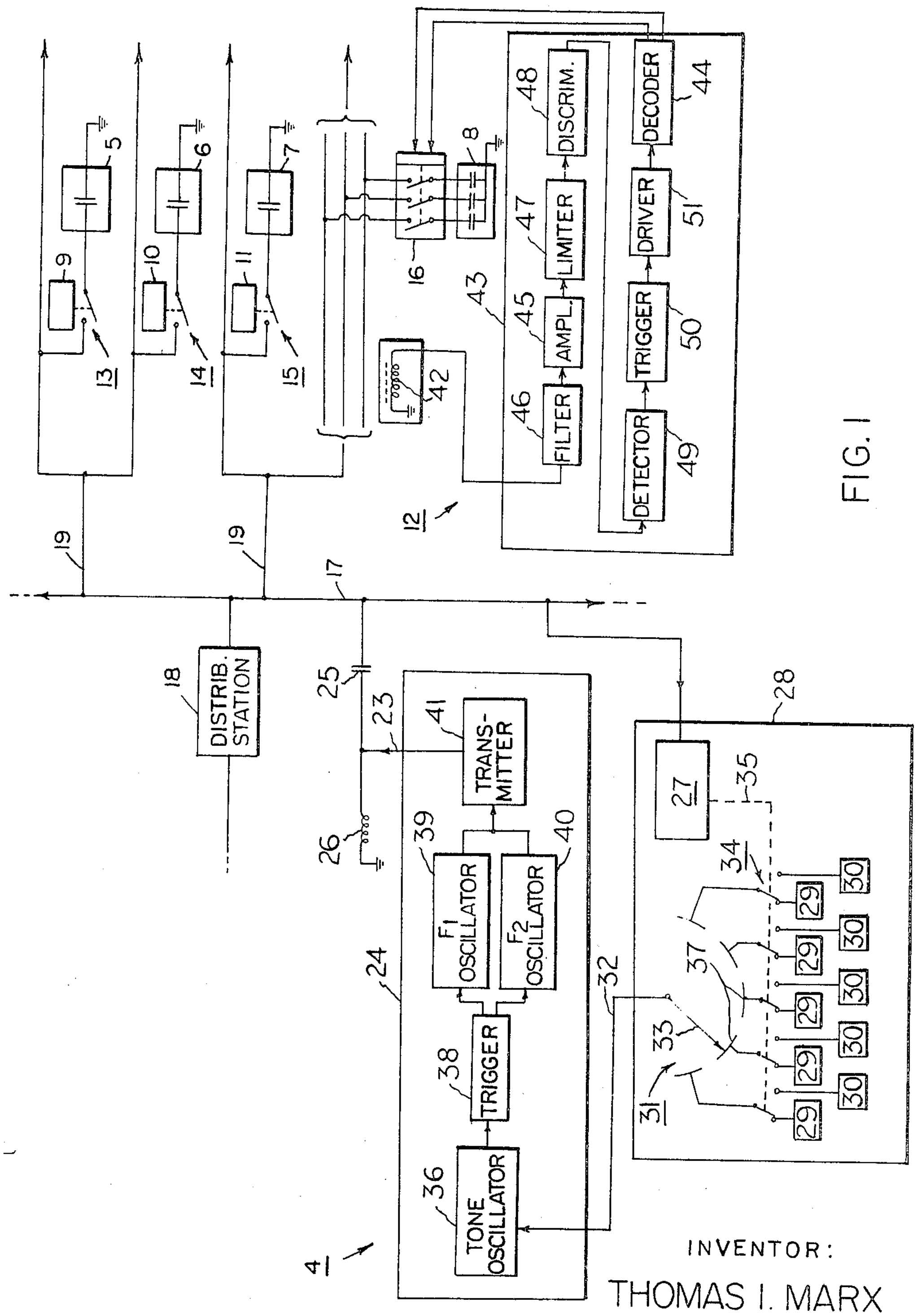
FIGURE 1 illustrates, in schematic and block-diagram forms, a remote capacitor switching system wherein control is exercised through improved frequency-shift transmissions in accordance with the present invention.

The carrier-current type capacitor switching arrangement appearing in FIGURE 1 is associated with a power-distribution network including central-station signalling equipment 4 and a plurality of remotely-controlled capacitor banks, of which four (5–8) are illustrated. To control the capacitive reactance which is required in the network for optimum adjustment of power factor or voltage at any time, certain of these banks are automatically brought into or out of service by electrical control equipments, 9–12, associated with the switches 13–16. The desired controls are effected by command electrical signals of relatively low energy which are transmitted over the power-distribution lines at frequencies which are relatively high and readily distinguishable from the usual 60-cycle power transmissions. In a known typical design, the central-station control equipment 4 is shown to be coupled with a distribution voltage bus 17 served by distribution sub-stations 18, this bus in turn supplying a plurality of feeders 19 with which the corrective capacitor banks are arrayed. High-freqeuncy command signals (example: over 100 kc.) developed in output line 23 by the central-station transmitter 24 are capacitively coupled to the distribution bus 17 by a capacitor 25 associated with the customary grounded drain coil 26 which exhibits a high impedance at the signalling frequencies. These command signals are radiated through the feeder system supplied by the associated distribution station and reach all of the electrical control equipments (ex., 9–12) which serve the switches (13–16) for the power-factor correcting capacitor banks (5–8). A sensing device 27 of a known form, responds to conditions in the power system and is part of a programmer 28 which controls the transmitter 24 by initiating its generations of predetermined coded command signals characterizing the needs for more or fewer corrective capacitance banks in the power-distribution system. For these purposes, device 27 may be made responsive to any one of several load conditions, and may, for example, be sensitive to reactive load changes, to changes in kilowatt loads, or to bus voltages. In accordance with one programming technique, different audio-frequency electrical tones are generated in the transmitter under control of a plurality of "ON"-signal tuners 29, such as coil and vibrating reed units, which correspond in number to the remote capacitor banks, and these are paired for switching with "OFF"-signal tuners 30 which also control the generation of distinctive audio-frequency tones. Scanning apparatus 31 selectively connects these tuners, or encoders, to transmitter 24 via the coupling 32, in response to scanning control exercised by sensing device 27; the switching by electrical stepping switch wiper 33 may be periodic, for example, and serves to connect either the "ON" or "OFF" encoder coils to the transmitter, depending upon the instantaneous settings of the further switches 34 associated with each pair of the tuners 29 and 30. If, at the outset in any one scan, the sensing device 27 detects system need for added capacitance, the switches 34 will all be in the illustrated condition to couple "ON" signal tuners to the transmitter, and such tuners are switched in sequence until, at some point, device 27 senses that no further capacitors are needed and its output coupling 35 actuates the switches 34 to the opposite state such that only "OFF" signal tuners will be coupled to the transmitter during the remainder of that particular scanning sequence. Periodically-repeated scanning causes the varying system needs to be accurately reflected in the transmissions of sequential signals commanding the addition or withdrawal of capacitor banks from the system.

Each of the plurality of tuners 29 and the plurality of tuners 30 exhibits electrical characteristics which enable it to slave the frequency of an audio-frequency tone oscillator 36 in the main transmitter circuitry to a distinctive frequency which may be selectively distinguished by the remote control equipments or receivers (such as 9–12). Each such distinctive frequency is sufficiently different from the others to permit a clear and reliable discrimination to be made in the receivers, as by tuned reeds, such that only one of these will close or open its associated capacitor-bank switch in response to transmissions controlled by the tuners of one of the pairs of tuners 29 and 30. Whenever one of the tuners is coupled in a prolonged freqeuncy-controlling relationship with tone oscillator 36, as determined by the sustained dwell of stepping switch wiper 33 on one of the wide-angle commutator segments 37, the oscillator develops a correspondingly-sustained characterizing audio-frequency tone of one of the aforesaid distinctive frequencies. A synchronized multivibrator or trigger circuit 38, such as a Schmitt trigger, responds to the tone oscillator output by alternately gating the two fixed-frequency oscillators 39 and 40 to produce their different sustained bursts of fixed high-frequency outputs (example: frequencies F1 and F2 each of over 100 kc. and within about 4 kc. of one another) in alternation at the switching rate determined by the existing periodicity of the tone oscillator output. The alternately-gated sustained oscillator output signals thus characterize the desired intelligence (i.e., which capacitance-bank switch should be turned either on or off) in terms of the audio-frequency rate at which the fixed high-frequency (R.F.) are gated. Transmitting equipment 41 provides the output power needed to radiate this information effectively throughout the feeder system.

At each remote receiving site, the transmitted high-frequency signals are automatically sensed and evaluated to determine if the associated capacitor switch should be actuated by them. Considering the operation of control equipment 12, for example, the incoming alternated bursts of high-frequency command signals carried by feeder 19 induce corresponding signals in the ferrite-cored detector coil 42, and the receiver 43 responds to their coded rate of alternation by developing related sustained electrical signals having an audio-frequency component which is the same as the coding rate. Provided this audio-frequency component proves to be matched with one of the tunings of a decoder 44 (such as a decoder including two differently-tuned reeds), the receiver actuates the associated switch 16 to either connect or disconnect the capacitor bank 8 and thereby regulate the system power factor. Receiver 43 includes an R.F. amplifier 45, preferably preceded by an input filter 46, which delivers amplified versions of the two alternated bursts of R.F. signals to a limiter 47 wherein unwanted amplitude variations are eliminated. Thereafter, these limited signals are fed to a discriminator 48 and detector 49, with the result that the A.F. rate of alternation between the R.F. bursts is characterized by an audio-frequency electrical output. Multivibrator or trigger 50 responds to the latter output by producing a synchronized pulse output to a driver 51 which energizes the coils of the tuned relays in the decoder 44. Typically, the decoder may be of a known form including two tuned reed units which, when each is energized by a signal of a different predetermined audio frequency, each cause associated switch contacts to close intermittently. Integration of resulting pulses of current forced through the tuned-reed contacts yield substantially continuous excitation currents for latching relays which actuate the capacitor-bank switches 16. The other control equipments in the system function similarly, although the respective decoder tunings are different to insure that only the intended capacitor-bank switches will be either opened or closed at any time in response to transmissions of the two fixed-frequency signals which are being alternated at a given distinctive rate for command purposes. Advantageously, these fixed-frequency signals may be close together in the frequency spectrum, such that neither the system nor receiver band-pass requirements need be very broad. Further, except for the decoder tunings, which may be conveniently established by conventioned tuned-reed units, all of the receiver constructions and tunings may be substantially identical.

Figure 2:
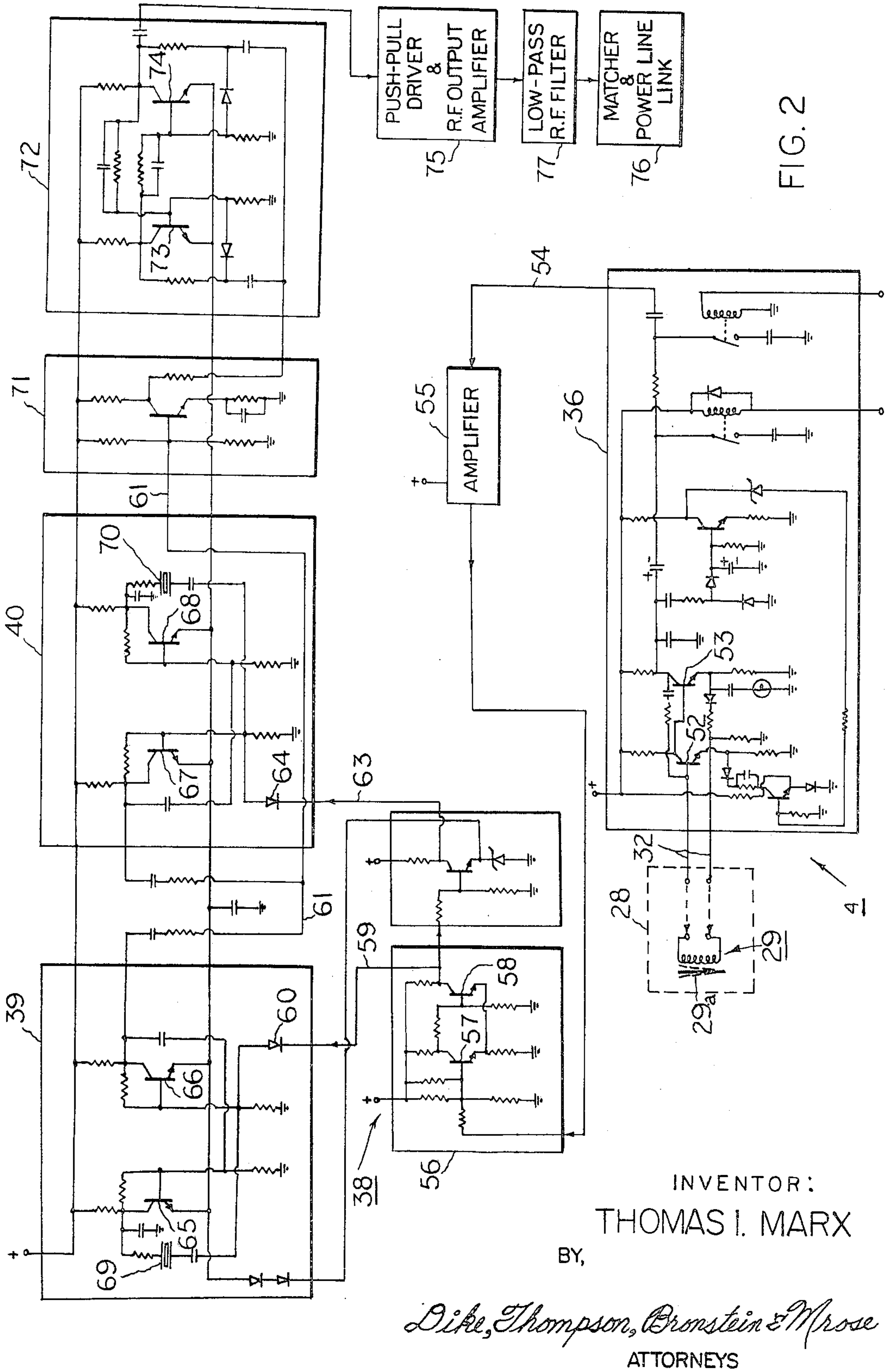
FIGURE 2 is a schematic and block-diagrammed representation of improved frequency-shift transmitting and encoding equipment such as that which may be used in the control system of FIGURE 1.

Further details concerning refinements of known constructions and operations of suitable programmers are not involved in or essential to an understanding of this invention, and are thus not recited herein; however, many such details may be found in U.S. Patent No. 3,002,147—Wasserman, for example. As appears schematically in FIGURE 2, the programmer 28 functions to connect various ones of the encoder or tone coils 28 and 29 to the transmitter tone oscillator 36, one of the "ON" coils 29 being shown in this connected relationship. Electrical characteristics of this coil are periodically varied by the nearby vibrating reed element 29*a*, and thereby cause the regenerative oscillator (including transistors 52 and 53) to produce an electrical output, in coupling 54, which has the same frequency as the natural resonant frequency of reed 29*a*. It should be understood, of course, that each of the programmed frequency-controlling units 29 and 30 includes similar reed-and-coil combinations, having distinctively different tunings, however, to insure that each will occasion a distinguishably different frequency of output from the tone oscillator when it is programmed into operation. The sustained individual outputs from oscillator 36, coded in terms of different audio frequencies are preferably amplified, in conventional circuitry 55, before being applied to a Schmitt trigger circuit 56 including the two cooperating transistors 57 and 58. When the latter circuit is in an "ON" state, it delivers a first gating pulse to the F1 oscillator 39 via coupling 59 and diode 60 and thereby conditions this oscillator to produce a burst of R.F. signals of one frequency (F1) in output line 61 substantially for the duration of that pulse. When the trigger is in the opposite or "OFF" state of operation, it actuates the driver amplifier 62 to deliver a second gating pulse to the F2 oscillator 40 via coupling 63 and diode 64 and thereby conditions that oscillator to produce a burst of R.F. signals of a second and distinguishably different frequency (F2) in the same output line (61) substantially for the duration of the second gating pulse. These two transistorized oscillators (including transistor pairs 65–66 and 67–68) are substantially identical, except for the different fixed natural frequencies (F1 and F2) of the responsive crystals 69 and 70 by which they are slaved in frequency. Typically, each burst of R.F. oscillator signals contains a large number of cycles, of course, even though it is of duration no greater than half a cycle of the coded audio-frequency signals from tone oscillator 36. Transistorized amplifier stage 71 responds to the alternated oscillator bursts by exciting a flip-flop frequency-halving circuit 72 (including transistors 73 and 74), which, in this particular embodiment, serves to reduce the frequencies of the respective bursts which are conveniently generated at frequencies higher than desired for the transmissions in the power-distribution system. Subsequently, push-pull driver R.F. amplifier circuitry 75 prepare the flip-flop outputs for radiation in the power system by way of a matcher and power link 76, which may include the capacitor 25, inductance 26, and bus 17 of FIGURE 1. Unwanted harmonics are suppressed by the low-pass R.F. filter 77.

Figure 3:
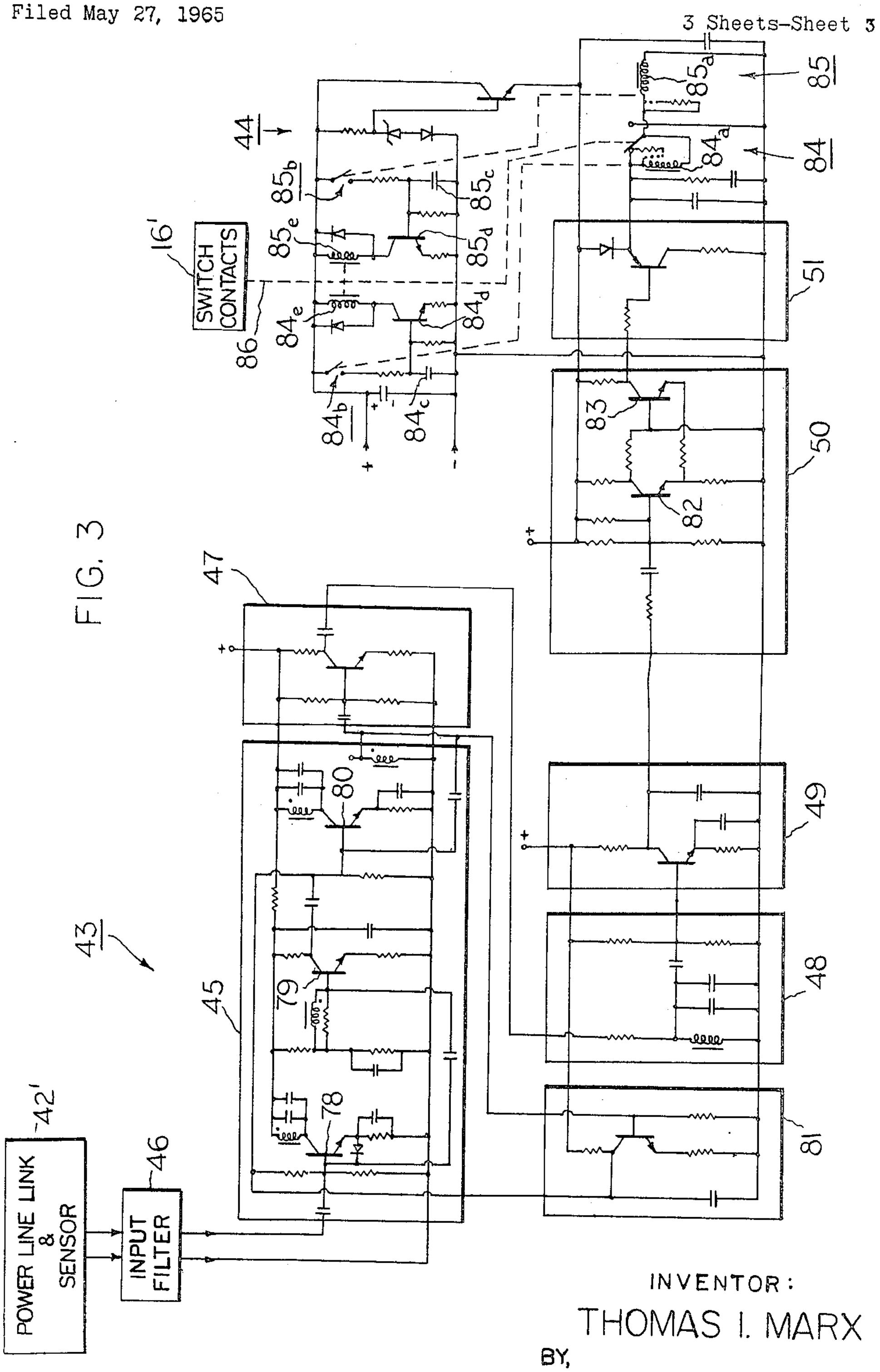
FIGURE 3 is a schematic and block-diagrammed representation of improved frequency-shift receiving and decoding equipment such as that which may be used in the control system of FIGURE 1.

In the typical receiver apparatus illustrated in FIGURE 3, the block-diagrammed power line link and sensor 42′ may comprise the detector coil 42 associated with power line 19, for example, and delivers the detected rate-coded alternated electrical R.F. bursts in the transmission system to the three-stage (i.e. transistors 78–80) tuned R.F. amplifier 45 through a filter which eliminates unwanted noise, harmonics, and so forth. The band-pass characteristic of this tuned R.F. amplifier may be relatively narrow, inasmuch as only two predetermined closely-spaced R.F. signals need be operated upon. A conventional type of limiter 47 causes the amplified R.F. bursts to be clipped to a predetermined amplitude, thereby further eliminating interference noise reflected in amplitude variations of the received bursts. Automatic gain control network 81, functioning in the usual way by detecting the amplified signals and controlling gain-regulating bias in the T.R.F. circuitry, may be used also. A simple parallel tuned-circuit type of slope discriminator network 48 is energized by the limited burst signals and delivers to the detector 49 related signals whose amplitudes are directly related to their R.F. frequencies. Audio-frequency outputs are then produced by the detector 49, with the perodicities thereof being governed by the coded rates at which the received R.F. bursts are being alternated to characterize the intelligence being transmitted at any time. Schmitt trigger circuit 50 (including the transistor pair 82–83) responds to these audio-frequency signals by producing corresponding pulse signals of predetermined amplitude, thus functioning as an audio-frequency limiter to eliminate possible errors due to amplitude variations in the signals emanating from the discriminator and detector. Driver amplifier 51 then supplies related audio-frequency signals, the frequencies of which are related to the coded rates of switching or alternation of the transmitted R.F. bursts, to the decoder 44. The latter unit is shown to include two tuned-reed switches, 84 and 85, which may serve respectively to "close" and "open" the main capacitor-bank latching switch contacts 16′. Coil **84*a* of the "close" switch 84 responds to sustained audio-frequency signals of one predetermined frequency from driver 51 by at least intermittently closing the associated switch 84*b*; and appropriately long R-C time constant (ex. about one second) is provided by the integration network including capacitor 84*c*, such that the coupled transistor 84*d* is not biased to substantial conduction until the decoded audio-frequency signal of interest has persisted for a relatively long period, thus guarding against responses to transient pulses and other extraneous signals. Coil 84*e* is energized when transistor 84*d* is positively switched into conduction in this manner, and causes the main switch contacts 16′ of known form to latch and hold into closure until positively released by a corresponding positive excitation of the switch-opening coil 85*e* associated with transistor 85*d*. The main switch actuating coupling with coils 84*e* and 85*e* is designated by dashed line-work 86. Tuned-reed switch coil 85*a* of the "open" switch 85 responds to audio-frequency signals of another distinguishably-different predetermined frequency from driver 51 by at least intermittently closing the associated switch 85*b*, and the relatively long time constant of its integration network including capacitor 85*c* insures that transistor 85*d* will only be actuated intentionally to energize coil 85*e* and to latch open the main switch contacts 16′**.

In an alternative arrangement, the decoding equipment need not include tuned-reed decoder elements and may, instead, include other frequency-sensitive devices such as sharply-tuned circuitry and known circuits which characterize different pulse-repetition rates. Similarly, at the transmitting end, the two oscillators may be switched at different rates under control of devices which need not include tuned-reed coding elements, such as separate A.F. oscillators. In each instance, however, it is important that each distinctive stepped rate at which the R.F. bursts are radiated, to characterize or encode a particular item of intelligence, be sustained for a relatively long period; when tuned-reed or tuned-fork detectors are used as decoders, they commonly require hundreds of cycles of excitation to respond properly, for example, although some detectors may respond more rapidly to tens of cycles.

The foregoing detailed description of frequency shifting between two fixed-frequency oscillators at the transmitter is not to be understood as requiring that each oscillator be entirely quiescent while the other is functioning; one of their outputs is instead conveniently gated on and off while the associated oscillator generates its signal. In the Schmitt trigger stage (38) preceding these oscillators (39 and 40), the gating output may statically be of either state, randomly, without affecting the system performance; this is advantageous in that there is no need for setting the gating state when no coded rate signals are being developed. The use of two fixed R.F. frequencies to code the transmitted intelligence is distinctly preferable and advantageous in that spurious noise effects are always eliminated in the receiver limiter stage 47; however, for some purposes where such improvement is not necessary, one of the frequencies may be zero, and FM-type discrimination is then not required in the receiver. Provided the coding frequency and burst or coded carrier frequencies are sufficiently different to permit an accurate and distinguishable characterization of the former by the latter, their frequencies need not be strictly confined to what are classically considered to be audio-and-radio frequencies. Nor is the application of these teachings restricted to control of capacitor switching over power lines, inasmuch as they may be highly useful for such purposes as simple switch-actuations, transformer tap-changing, remote-control switching in radio-dispatch systems, remote control of domestic water heaters, and either wired or wireless telemetering systems, and the like.

What I claim as new and desire to secure by Letters Patent of the United States is:

1. Remote control apparatus for use in a power distribution system including a power distribution station for supplying electric power to transmission lines, and which system includes switching means for controlling the connection of electrical apparatus with the transmission lines and means at the power distribution station for selecting when the connection of the electrical apparatus is to be changed, said remote control apparatus including transmitter means for supplying to the transmission lines a burst of relatively high-frequency electrical outputs responsive to each of electrical control impulses, coding apparatus actuated by the selecting means for selectively applying said control impulses to said transmitter at sustained relatively low repetition rates which distinctively characterize different connection conditions for the electrical apparatus, at least one remote switching control station associated with the electrical apparatus and with the switching means for controlling the condition of connection of the electrical apparatus with the transmission lines, and receiver means in said control station including means for receiving the transmitted high-frequency electrical outputs and deriving therefrom sustained electrical signals of relatively low repetition rates related to said repetition rates of said control impulses, and means responsive to said derived electrical signals of predetermined repetition rates for actuating said switching means.

2. Remote control apparatus as set forth in claim 1 wherein each said burst of electrical outputs contains radio-frequency signals, wherein said relatively low repetition rates of said control impulses and derived electrical signals, and wherein said control impulses applied by said coding apparatus at each of said repetition rates to characterize said different conditions are sustained by repetition a plurality of times.

3. Remote control apparatus as set forth in claim 2 wherein said means responsive to said derived electrical signals includes resonant electrically-actuated switch means tuned at an audio frequency for response to one of said predetermined repetition rates.

4. Remote control apparatus as set forth in claim 3 wherein said coding apparatus includes at least one resonant electrically-actuated means tuned at an audio frequency and producing a predetermined audio-frequency electrical output, and means producing said control impulses responsive to and at a repetition rate related to said audio-frequency output, and further wherein said transmitter includes at least one oscillator for producing discrete bursts of said radio-frequency signals replated at said repetition rate related to said audio-frequency output responsive to said control impulses.

5. Remote control apparatus as set forth in claim 2 wherein said coding apparatus includes resonant means producing a predetermined audio-frequency output, and means producing said control impulses responsive to and at a repetition rate related to said audio-frequency output, and further wherein said transmitter includes oscillator circuit means producing bursts of radio-frequency signals at one and another of two predetermined frequencies in alternation in response to alternate ones of said control impulses.

6. Remote control apparatus as set forth in claim 5 wherein said oscillator circuit means includes first and second substantially fixed-frequency oscillators tuned to distinguishably different but relatively close predetermined radio frequencies, and means controlled by alternate ones of said control impulses for sending the radio-frequency outputs of said oscillators alternately over the transmission lines.

7. Remote control apparatus as set forth in claim 6 wherein said receiver means includes amplifying and limiting the received radio-frequency outputs, discriminator means producing sustained electrical signals having audio frequencies related to the rates of alternation between the limited outputs, and wherein said means for actuating said switching means is responsive to said sustained audio-frequency electrical signals.

8. Transmitter apparatus for use in a remote control system associated with a power distribution system supplying electrical power to transmission lines and including switching means for controlling the connection of electrical apparatus with the transmission lines and means at a power distribution station for selecting when the connection of the electrical apparatus is to be changed, comprising transmitter means for radiating a burst of relatively high-frequency electrical outputs responsive to each of electrical control impulses, means for selecting when the connection of the electrical apparatus is to be changed, and coding apparatus actuated by the selecting means for selectively applying said control impulses to said transmitter means at least at one sustained relatively low repetition rate which characterizes a selected change in the condition of connection of the electrical apparatus with the transmission lines.

9. Transmitter apparatus as set forth in claim 8 wherein each said burst of electrical outputs contains radio-frequency signals, wherein said sustained relatively low repetition rate at which said control impulses are applied to said transmitter means is at the repetition rate of audio-frequency signals, and wherein said control impulses are sustained by repetition a plurality of times.

10. Transmitter apparatus as set forth in claim 9 wherein said coding apparatus includes at least one resonant electrically-actuated means tuned at an audio frequency and producing a predetermined audio-frequency electrical output, and means producing said control impulses responsive to and at a repetition rate related to said audio-frequency output, and further wherein said transmitter means includes at least one oscillator for producing discrete bursts of said radio-frequency signals repeated at said repetition rate related to said audio-frequency output responsive to said control impulses.

11. Transmitter apparatus as set forth in claim 9 wherein said coding apparatus includes resonant means producing at least one predetermined audio-frequency output, and means producing said control impulses responsive to and at a repetition rate related to said audio-frequency of said output, and further wherein said transmitter includes oscillator circuit means producing bursts of radio-frequency signals at one and another of two predetermined frequencies in alternation in response to alternate ones of said control impulses.

12. Transmitter apparatus as set forth in claim 11 wherein said oscillator circuit means includes first and second substantially fixed-frequency oscillators tuned to distinguishably different but relatively close predetermined radio frequencies, and means controlled by alternate ones of said control impulses for sending the radio frequency outputs of said oscillators in alternation over the transmission lines.

13. Transmitter apparatus as set forth in claim 12 wherein said resonant means producing said predetermined audio-frequency output includes an audio-frequency tone oscillator, wherein said coding apparatus includes at least one frequency-controlling circuit element and means for selectably connecting said circuit element with said tone oscillator in a frequency-controlling relation therewith which governs said predetermined audio frequency of the output thereof, and wherein said means producing said control impulses comprises a trigger circuit having either of two electrical output-producing conditions which are dependent upon changes in characteristics of said predetermined audio-frequency output of said tone oscillator.

14. Receiver apparatus for use in a remote control system which is associated with a power distribution system supplying electric power to transmission lines and which involves transmissions of bursts of relatively high-frequency electrical outputs at least at one predetermined sustained relatively low repetition rate characterizing command for controlling the connection of electrical apparatus with the transmission lines, comprising means for receiving the transmitted high-frequency electrical outputs and deriving therefrom sustained electrical signals of a relatively low repetition rate related to said predetermined repetition rate characterizing command, and means responsive to said derived electrical signals of said low repetition rate for controlling the connection of the electrical apparatus with the transmission lines.

15. Receiver apparatus as set forth in claim 14 wherein said receiving means is tuned to receive said electrical outputs at radio frequency, wherein said sustained electrical signals are at the repetition rate of a predetermined audio frequency, and wherein said means responsive to said derived electrical signals comprises resonant electrically-actuated switch means tuned at said predetermined audio frequency.

16. Receiver apparatus as set forth in claim 15 wherein said receiving means is tuned to receive bursts of said electrical outputs at two distinguishably different predetermined radio frequencies, and wherein said receiver means includes means amplifying and limiting the received radio-frequency bursts of outputs, and frequency-discriminator means deriving said sustained electrical signals having audio frequencies related to the repetition rates of said limited bursts of outputs.

17. Receiver apparatus as set forth in claim 16 wherein said discriminator means includes a detector, and further comprising means responsive to the audio-frequency output of said detector producing related audio-frequency signals having a predetermined amplitude, and wherein said electrically-actuated switch means is responsive to said audio-frequency signals of said predetermined amplitude.

References Cited

UNITED STATES PATENTS

| | | | |
|---|---|---|---|
| 3,002,146 | 9/1961 | Lorrig et al. | 340—163 XR |
| 3,020,399 | 2/1962 | Hollis | 325—163 XR |
| 3,061,783 | 10/1962 | Noller | 340—171 XR |
| 3,223,779 | 12/1965 | McFarlane | 325—30 XR |
| 2,830,241 | 4/1958 | Turck | 343—225 XR |
| 3,413,556 | 11/1968 | King | 325—320 |

DONALD J. YUSKO, Primary Examiner

U.S. Cl. X.R.

323—105; 340—163